Nov. 28, 1939.     W. D. SMITH     2,181,612
COCKTAIL SHAKER
Filed May 17, 1939
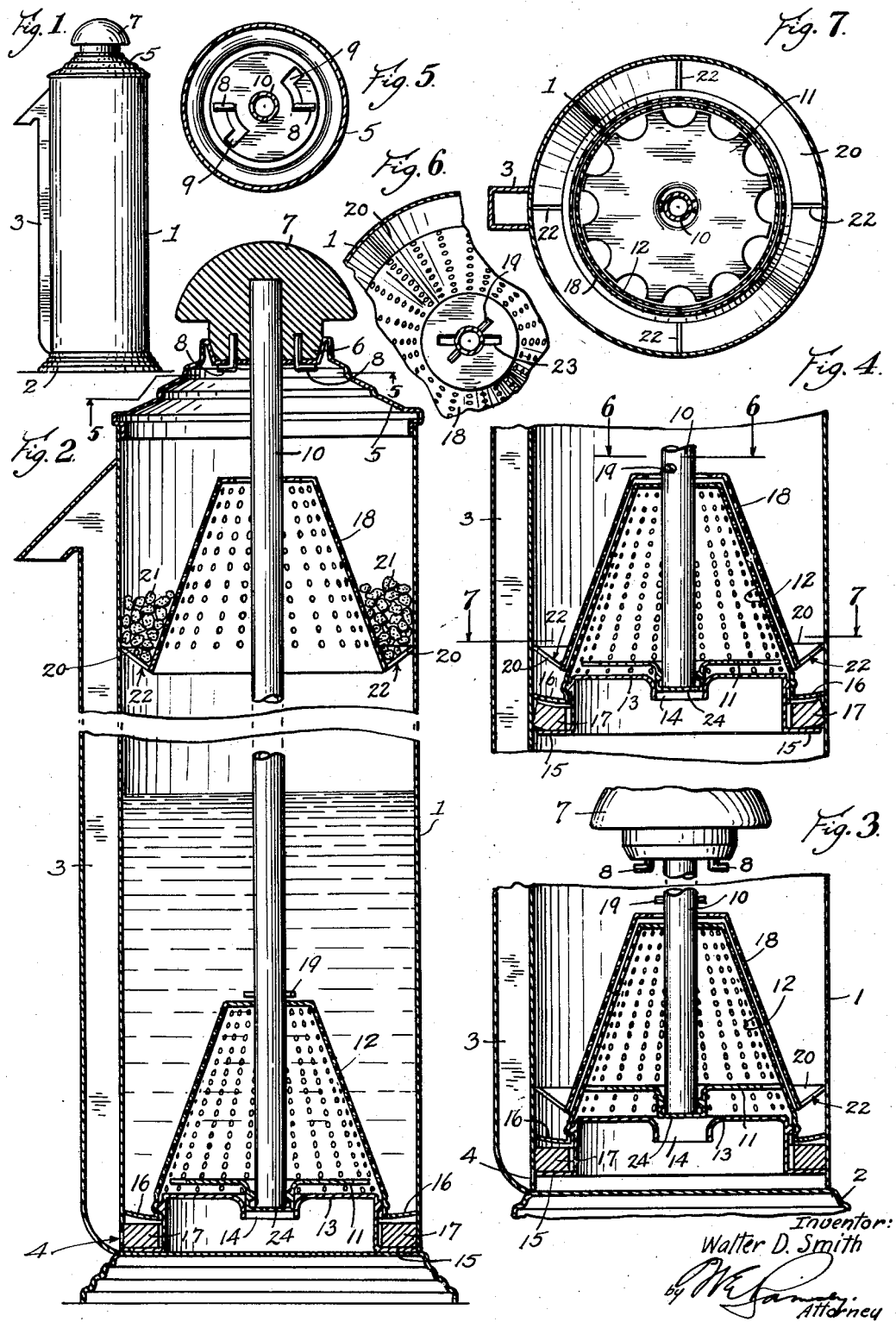
Inventor:
Walter D. Smith
by [signature]
Attorney Patented Nov. 28, 1939

2,181,612

UNITED STATES PATENT OFFICE 2,181,612

COCKTAIL SHAKER

Walter D. Smith, Portland, Oreg., assignor to Louise Hamlin

Application May 17, 1939, Serial No. 274,182

14 Claims. (Cl. 221—78)

The principal object of my invention is to provide a cocktail shaker whose liquid content may be separated from the solids therein and served more conveniently than has heretofore been possible. Cocktail shakers now in use are objectionable in that they provide for pouring the liquid through a screen that usually becomes partly obstructed so that said liquid flows slowly and the pouring of cocktails is obstructed.

I attain said object by providing a movable screen adapted to rest near the bottom of the cocktail shaker, the ingredients of the cocktails being placed above said screen and shaken after which said screen may be lifted to permit the liquid portion of said ingredients to drain downward while the solid matter, such as cracked ice and lemon seeds and pulp remain above said screen. In this way said solid matter is always separated by said screen from the lower part of said shaker, and I provide a spout at the lower end, and means for conveniently removing the liquid from said lower part and serving it in suitable quantities.

A further object of my invention is to provide a cocktail shaker having a spout at a convenient height for filling a glass, and a pump adapted to force the liquid contents of said shaker therethrough. However, I do not wish to provide a special cylinder for said pump. I therefore place said spout on the outside of a straight sided cylinder comprising the body of the cocktail shaker, and I utilize said cylinder as the pump cylinder. In this way, I not only save the cost of a special pump cylinder, but I also save the necessity of cleaning a special part, and I secure a rapid pumping action inasmuch as said cylinder is large in diameter.

A further object of my invention is to provide a cocktail shaker having a spout that is automatically closed while said shaker is being shaken, thereby preventing the spilling of its contents. I attain said object by providing an opening from said spout into said cocktail shaker of the proper shape and located in the proper position to be covered by a packing element, hereinafter described, when the latter is in the position it is adapted to occupy when said shaker is being shaken.

A further object of my invention is to provide an annular packing element for a pump piston for a cocktail shaker, and a housing therefor, adapted to bind against the walls of the cylinder with which it co-operates on its pumping stroke, and to operate freely therein on its return stroke. I am thus enabled to utilize the body of a cocktail shaker, that is not quite true, for a pump cylinder; I can use a drawn or rolled cylinder without machining it. I attain said object by sloping the aforesaid housing in such a way that it causes said member to be slightly dished on the pumping stroke, thus presenting a corner to the inner surface of said cylinder that is somewhat larger in diameter than the undished packing element. I prefer to make the opposite side of said housing flat so that said member will lie in a plane on its return stroke.

A further object of my invention is to provide a cocktail shaker having a perforated screening member adapted to contain the solid portion of the contents thereof, said screening member being adapted to be immersed in the liquid portion of said contents, in one position, and to be raised above said liquid contents in another position. In this way, said solid contents are allowed to drain, while the liquid content below is immediately available for serving.

A further object of my invention is to provide a cocktail shaker having a pump piston adapted to carry a screen for separating the solids from the liquid content. I prefer to make said screen large and more or less cone-shaped in order to provide an adequate screening area. Thus, on the upward stroke of said piston, said solids tend to pack on the surface of said strainer. Then on the downward stroke they become loosened. Inasmuch as I provide a large piston, it is most convenient in serving cocktails to operate said pump through only a rather short stroke, and said solid contents thus do not become packed on said screening surface sufficiently to interfere therewith.

A further object of my invention is to provide a cocktail shaker having a spout, pump, and screening members that may be cheaply constructed and easily cleaned.

Other objects and advantages of my invention will be described with reference to the accompanying drawing, in which:

Fig. 1 is a side view of a cocktail shaker embodying my invention;

Fig. 2 is a foreshortened vertical section through said cocktail shaker;

Fig. 3 is a fragmentary vertical section similar to Fig. 2, but with the piston shown partially raised;

Fig. 4 is a fragmentary vertical section showing said piston in the position it assumes while being lowered;

Fig. 5 is a horizontal section taken on the line 5—5 in Fig. 2;

Fig. 6 is a fragmentary horizontal section taken on the line 6—6 of Fig. 4;

Fig. 7 is a horizontal section taken on the line 7—7 in Fig. 4.

A cocktail shaker embodying my invention comprises a cylindrical body 1 mounted on a flaring base 2. Said body may be made in the form of a seamless tube, if desired, and said base may be formed in a punch press and soldered or otherwise secured to said body. A spout 3 may be secured along the side of said body, leading from aperture 4 upward to a height above the level to which said cocktail shaker is to be filled. The liquid content of said shaker will thus not run out at the top of said spout when said shaker rests on its base.

Said cocktail shaker has a cover 5 adapted to fit snugly in the top thereof. Said cover has formed in its upper portion a tapered depression 6 adapted to co-operate with similarly tapered knob 7 to form a leak-proof connection when said knob is secured in place by offset pins 8 engaging bayonet slots 9. Said pins may be inserted in said bayonet slots and rotated slightly to secure the knob in place. I prefer to arrange said pins under the tapered portion of depression 6 rather than near the center thereof since said pins then hold said knob firmly against said tapered portion, whereas they would merely spring the metal if they were located near the center.

The pins 8 may be embedded in said knob when the latter is molded, if desired, as may be tubular rod 10. I prefer to make said knob of Bakelite, or some other similar moldable material. Rod 10 carries at its lower end a spider member 11 adapted to engage screen 12 and plate 13 to raise or lower the latter two members. Plate 13 has formed at its center a tapered aperture 14 adapted to engage a similarly tapered boss formed at the center of spider 11 thereby to form a valve 24 adapted to close when said knob is thrust downward, and to open when it is lifted. Said spider may be snap-fastened on said rod, if desired, and screen 12 may be similarly fastened to plate 13, this construction permitting said parts to be readily disengaged for cleaning or for replacement of the packing element, hereinafter described.

Plate 13 has formed around its circumference a flange 15 substantially normal to the inner wall surface of body 1. Screen 12 has a flange 16 oblique to said inner wall, said two flanges comprising a chamber somewhat deeper at its periphery than at its inner edge. Packing element 17 is adapted to be contained within said chamber and to act as a seal between said chamber and said inner wall surface when knob 7 is thrust downward. The pumping action thus produced is adapted to force the liquid content of the shaker out through aperture 4 and upward through spout 3. The upper end of said spout is preferably inclined downward to facilitate filling a glass therefrom.

The angle between flange 16 and the inner wall surface of said body results in the dishing of said packing element, as is shown in Fig. 4. Said packing element thus makes tight engagement with said inner wall when said knob is thrust downward on the pumping stroke. On the other hand, on the return stroke flange 15 causes said packing member to remain flat, as is shown in Fig. 3, thereby allowing said knob to be raised easily. I prefer said packing ring to fit loosely in said housing, to be held in contact with said inner wall by virtue of its own size and shape rather than that of the chamber in which it is housed, and I prefer to make said packing element of cork.

A second screen 18 slidably carried by said rod 10 is adapted to be pushed downward within said body by pin 19 which may be press-fitted in rod 10. In Fig. 4 said screen is shown in the position it assumes while being pushed downward. Flange 20 formed about the periphery of said screen is turned upward for a substantial distance thereby to contain a substantial quantity of solid matter, such as cracked ice 21. Said flange is divided into several segments by slots 22, and I prefer it to be of such size that it will support itself by frictional engagement with the inner wall surface of the body 1. After the shaking of the contents of the cocktail shaker is finished, knob 7 may be lifted thus raising screen 18 to a position near the top of body 1. Then said knob may be rotated slightly, until pin 19 slips through slot 23 in screen 18. Thus said screen is allowed to remain near the top of the shaker while the pump hereinbefore described is operated.

I prefer to make aperture 4 oblong in shape, its longer axis being horizontal, and its shorter axis somewhat less than the thickness of said packing element. Then, when said packing element is down in its position for shaking cocktails it will cover said aperture and prevent liquid flowing into said spout where it might be spilled. I intend that screen 18 shall separate the greater part of the solid material from the liquid, and that screen 12 shall separate the remainder. If said cocktail shaker is to be used with ingredients having little or no pulp or other solids, it may be satisfactory to dispense with screen 12, and any other suitable means may be provided for connecting spider 11 to plate 13 whereby said plate will be lifted when said spider has been lifted a small amount sufficient to open valve 24.

While I have described my invention as a container for mixing and serving cocktails, it will be understood that it may be used for concocting, straining, and serving other drinks.

I claim:

1. A mixer comprising a cup-shaped cylindrical vessel, a removable cover therefor, a plunger having an operating rod extending through said cover, a strainer reciprocally mounted on said rod, means releasably joining said rod and strainer, said strainer provided with a peripheral flange proportioned and arranged frictionally to engage the inner wall surface of the vessel with such intensity as to hold the strainer free of its releasable connection with said rod, and a pouring spout communicating with the interior of the vessel through an aperture arranged at a point adjacent the bottom of the latter.

2. A mixer comprising a cup-shaped cylindrical vessel, a removable cover therefor, a plunger having an operating rod extending through said cover, a strainer reciprocally mounted on said rod, means releasably joining said rod and strainer, said strainer provided with an upwardly cupped peripheral flange proportioned and arranged frictionally to engage the inner wall surface of the vessel with such intensity as to hold the strainer free of its releasable connection with said rod, and a pouring spout communicating with the interior of the vessel through an aperture arranged at a point adjacent the bottom of the latter.

3. A mixer comprising a cup-shaped cylindrical vessel, a removable cover therefor, a plunger having an operating rod extending through said cover, a strainer reciprocally mounted on said rod, a pin and slot connection releasably joining said rod and strainer, said strainer provided with a peripheral flange proportioned and arranged frictionally to engage the inner wall surface of the vessel with such intensity as to hold the strainer free of its releasable connection with said rod, and a pouring spout communicating with the interior of the vessel through an aperture arranged at a point adjacent the bottom of the latter.

4. A mixer comprising a cup-shaped cylindrical vessel, a removable cover therefor, a plunger having an operating rod extending through said cover, said plunger comprising a pair of spaced peripheral flanges spaced apart and defining between them a chamber opening to the inner face of the vessel, a distortable sealing element loosely carried in said chamber, and a pouring spout communicating with the interior of the vessel through an aperture arranged at a point adjacent the bottom of the latter, said sealing element being adapted to overlie and seal said aperture at the end of the downward stroke of the plunger.

5. A mixer comprising a cup-shaped cylindrical vessel, a removable cover therefor, a plunger having an operating rod extending through said cover, said plunger comprising a pair of spaced peripheral flanges spaced apart and defining between them a chamber opening to the inner face of the vessel, a distortable sealing element loosely carried in said chamber, a hollow perforated head, a valve element formed centrally thereof, and a port arranged in said plunger, in operative alignment with said valve element, said valve being arranged to uncover said port when said rod is raised and to seat over said port when said rod is lowered.

6. A mixer comprising a cup-shaped cylindrical vessel, a removable cover therefor, a plunger having an operating rod extending through said cover, said plunger comprising a pair of spaced peripheral flanges spaced apart and defining between them a chamber opening to the inner face of the vessel, a distortable sealing element loosely carried in said chamber, a hollow perforated head, a spider element carried by said rod and lying within said head, a valve element formed centrally thereof, and a port arranged in said plunger, in operative alignment with said valve element, said spider adapted to have limited operative movement in said head to lift and seat said valve over said port.

7. A mixer comprising a cup-shaped cylindrical vessel, a removable cover therefor, a plunger having an operating rod extending through said cover, said plunger comprising a pair of spaced peripheral flanges spaced apart and defining between them a chamber opening to the inner face of the vessel, a distortable sealing element loosely carried in said chamber, a hollow perforated head, a spider element carried by said rod and lying within said head, a valve element formed centrally thereof, and a port arranged in said plunger, in operative alignment with said valve element, said spider adapted to have limited operative movement in said head to lift and seat said valve over said port, said valve being arranged to uncover said port when said rod is raised and to seat over said port when said rod is lowered.

8. A mixer comprising a cup-shaped cylindrical vessel, a removable cover therefor, a plunger having an operating rod extending through said cover, said plunger comprising a pair of spaced peripheral flanges spaced apart and defining between them a chamber opening to the inner face of the vessel, and a distortable sealing element loosely carried in said chamber, the portions of said plunger defining said chamber comprising two lateral flanges, the lower flange extending substantially normal to the inner face of the housing and the upper one extending obliquely thereto thereby to flex and position the sealing element at opposite movements of the plunger.

9. A mixer comprising a cup-shaped cylindrical vessel, a removable cover therefor, a plunger having an operating rod extending through said cover, said plunger comprising a pair of spaced peripheral flanges spaced apart and defining between them a chamber opening to the inner face of the vessel, and a distortable sealing element loosely carried in said chamber, said chamber having a floor and roof surface forming oblique angles one with the other thereby to flex and position the sealing element at opposite movements of the plunger.

10. A mixer comprising a cup-shaped cylindrical vessel, a removable cover therefor, a plunger having an operating rod extending through said cover, said plunger comprising a pair of spaced peripheral flanges spaced apart and defining between them a chamber opening to the inner face of the vessel, and a distortable sealing element loosely carried in said chamber, the portions of said plunger defining said chamber comprising two lateral flanges, the lower flange extending substantially normal to the inner face of the housing and the upper one extending obliquely thereto thereby to flex and position the sealing element at opposite movements of the plunger, said flanges being removably secured together.

11. A mixer comprising a cup-shaped cylindrical vessel, a removable cover therefor, a plunger having an operating rod extending through said cover, said plunger comprising a pair of spaced peripheral flanges spaced apart and defining between them a chamber opening to the inner face of the vessel, a distortable sealing element loosely carried in said chamber, a hollow perforated head, a valve element formed centrally thereof, and a port arranged in said plunger, in operative alignment with said valve element, said valve being arranged to uncover said port when said rod is raised and to seat over said port when said rod is lowered, a strainer reciprocally mounted on said rod, and means releasably joining said rod and strainer, said strainer and head adapted to rest one within the other at the lowest position of the plunger rod.

12. A mixer comprising a cup-shaped cylindrical vessel, a removable cover therefor, a plunger having an operating rod extending through said cover, said plunger comprising a pair of spaced peripheral flanges spaced apart and defining between them a chamber opening to the inner face of the vessel, a distortable sealing element loosely carried in said chamber, a hollow perforated head, a valve element formed centrally thereof, and a port arranged in said plunger, in operative alignment with said valve element, said valve being arranged to uncover said port when said rod is raised and to seat over said port when said rod is lowered, a strainer reciprocally mounted on said rod, means releasably joining said rod and strainer, said strainer and head adapted to rest one within the other at the lowest position of the plunger rod, and a pouring spout communicating with the interior of the vessel through an aperture arranged at a point adjacent the bottom of the latter, said sealing element being adapted to overlie and seal said aperture at the end of the downward stroke of the plunger.

13. A mixer comprising a cup-shaped cylindrical vessel, a removable cover therefor, a plunger having an operating rod extending through said cover, said plunger comprising a pair of spaced peripheral flanges spaced apart and defining between them a chamber opening to the inner face of the vessel, a distortable sealing element loosely carried in said chamber, a hollow perforated head, a spider element carried by said rod and lying within said head, a valve element formed centrally thereof, and a port arranged in said plunger, in operative alignment with said valve element, said spider adapted to have limited operative movement in said head to lift and seat said valve over said port, said valve being arranged to uncover said port when said rod is raised and to seat over said port when said rod is lowered, a strainer reciprocally mounted on said rod, means releasably joining said rod and strainer, said strainer and head adapted to rest one within the other at the lowest position of the plunger rod, said strainer provided with a peripheral flange proportioned and arranged frictionally to engage the inner wall surface of the vessel with such intensity as to hold the strainer free of its releasable connection with said rod, said chamber having a floor and roof surface forming oblique angles one with the other thereby to flex and position the sealing element at opposite movements of the plunger, said flanges being removably secured together, and a pouring spout communicating with the interior of the vessel through an aperture arranged at a point adjacent the bottom of the latter, said sealing element being adapted to overlie and seal said aperture at the end of the downward stroke of the plunger.

14. A mixer comprising a cup-shaped cylindrical vessel, a removable cover therefor, a plunger having an operating rod extending through said cover, said plunger comprising a pair of spaced peripheral flanges spaced apart and defining between them a chamber opening to the inner face of the vessel, a distortable sealing element loosely carried in said chamber, a hollow perforated head, a spider element carried by said rod and lying within said head, a valve element formed centrally thereof, and a port arranged in said plunger, in operative alignment with said valve element, said spider adapted to have limited operative movement in said head to lift and seat said valve over said port, said valve being arranged to uncover said port when said rod is raised and to seat over said port when said rod is lowered, a strainer reciprocally mounted on said rod, means releasably joining said rod and strainer, said strainer and head adapted to rest one within the other at the lowest position of the plunger rod, said strainer provided with an upwardly cupped peripheral flange proportioned and arranged frictionally to engage the inner wall surface of the vessel with such intensity as to hold the strainer free of its releasable connection with said rod, the portions of said plunger defining said chamber comprising two lateral flanges, the lower flange extending substantially normal to the inner face of the housing and the upper one extending obliquely thereto thereby to flex and position the sealing element at opposite movements of the plunger, and a pouring spout communicating with the interior of the vessel through an aperture arranged at a point adjacent the bottom of the latter, said sealing element being adapted to overlie and seal said aperture at the end of the downward stroke of the plunger.

WALTER D. SMITH.